United States Patent [19]

Liebler et al.

[11] 4,167,752

[45] Sep. 11, 1979

[54] COLOR VIDEO DISPLAY FOR AUDIO SIGNALS

[76] Inventors: Jerome E. Liebler, 3182 Briar Hill, Milford, Mich. 48042; Walter M. Rubinstein, 25801 Southwood, Southfield, Mich. 48075

[21] Appl. No.: 838,829

[22] Filed: Oct. 3, 1977

[51] Int. Cl.² ............................................ H04N 9/02
[52] U.S. Cl. ................................................. 358/82
[58] Field of Search .................... 358/81, 82; 79/1 SP

[56] References Cited

U.S. PATENT DOCUMENTS

| | | | |
|---|---|---|---|
| 3,723,652 | 3/1973 | Alles et al. | 358/82 X |
| 4,001,880 | 1/1977 | Delikat | 358/81 |
| 4,068,262 | 1/1978 | Sandler et al. | 358/82 |
| 4,081,829 | 3/1978 | Brown | 358/82 |

Primary Examiner—Richard Murray
Attorney, Agent, or Firm—Krass & Young

[57] ABSTRACT

A system for generating an aesthetically pleasing abstract display on the screen of a color television receiver in timed relation to an audio signal derived from music or the like employs a filter network to divide the audio signal into a plurality of separate frequency bands. These signals are provided to the inputs of three modulators along with video pattern signals developed by a digital/analog mapping network connected to the outputs of various stages of an oscillator driven counter chain. The same counter chain produces the horizontal and vertical synchronization signals for the receiver so that the display is generated in timed relation to the raster scan of the television receiver. The three modulators receive certain of the audio signals and certain of the analog signals and their outputs are provided to the three chrominance inputs of the receiver either directly or via an RF transmitter which allows connection to the antenna of the TV set.

9 Claims, 5 Drawing Figures

COLOR VIDEO DISPLAY FOR AUDIO SIGNALS

BACKGROUND OF THE INVENTION

1. Field of Invention

This invention relates to a system for generating an abstract display on the screen of a TV receiver, which display varies in timed relation to an audio signal derived from music or the like.

2. Description of the Prior Art

A variety of "psychedelic" lights are available which include electronic circuits for receiving an audio signal, either in acoustic form through a microphone, or via a direct electrical connection to a music source such as a phonograph, and which modulate a light display in timed relation to the changes in the audio signal. These lights provide an optical translation of the source and change color or intensity in timed relation to the beat, intensity or frequency content of the music.

In view of the wide availability of color television sets it has been proposed to provide converter circuits for picking up audio signals and use them to generate sets of signals which would modulate the chrominance and/or luminance circuits of color TV receivers to provide highly versatile equivalents of such psychedelic lights. U.S. Pat. No. 3,723,652 discloses such a system including circuitry for splitting an incoming audio signal into several frequency bands such as low frequencies, mid-range frequencies, and high frequencies, and using these signals to modulate the chrominance circuits on a color TV receiver.

These prior art systems have concentrated on producing a display intimately related to the content of the audio signal and while they may produce an aesthetically pleasing display with certain forms of music the displays produced with other types of music are often either too static or too disorganized to be aesthetically pleasing.

The saleability of psychedelic display generators for color TV receivers is of course a function of the degree to which their displays are aesthetically satisfying. The present invention broadly contemplates such a generator which provides an unusually satisfying display that the user can readily modify to produce forms which are pleasing.

SUMMARY OF THE INVENTION

The present invention is broadly directed toward a system for generating chrominance signals for a color television receiver as a function of both a received audio signal and an internally generated display pattern. The audio signal may be generated by a microphone incorporated in the system to pick up signals in the vicinity of the set or the unit may be directly wired to a sound source.

The received audio signal is divided into a plurality of sub-signals, each of which is a function of one of a different component of the audio signal. In the preferred embodiment of the invention each audio sub-signal is a function of one frequency band within the incoming audio signal; three sub-signals are derived employing a band pass filter, a high pass filter and a low pass filter.

Independently of the audio signals a plurality of display pattern signals are derived. In the preferred embodiment of the invention these display patterns are abstract in nature, bearing no relation to any physical entity, and are generated in timed relation to the raster scan of the television system by a digital/analog pattern generator or mapping network. The pattern generator employs a chain of dividing counters driven by a crystal controlled oscillator. Resistances of arbitrary values are connected to various stages of the counter and are connected in a plurality of summing networks. These produce a plurality of display sub-patterns. The dividing counters are also used to generate horizontal and vertical synchronization signals for the raster scan of the television signal. Accordingly, the digital/analog converter produces a plurality of display sub-signals which change in timed relation to the display.

Three modulators are provided in the preferred embodiment of the system. Each modulator is connected to certain of the audio sub-signals and certain of the display sub-signals. The modulators produce outputs which are functions of both their display and the audio inputs and these output signals are used to drive the chrominance generators of the TV receiver. The connections may be direct or, as in the preferred embodiment of the invention, both the chrominance signals and the synchronization signals may be used to modulate radio frequency signals to produce an equivalent of the standard transmitted television signal. This signal may be applied directly to the antenna of a television receiver without in any way modifying the receiver, so that by turning the receiver to an appropriate channel which is unused in that area the video display produced by the receiver may be observed.

The preferred embodiment of the invention also incorporates capacitors connected to various of the resistors in the digital/analog display converter to control the rise and decay time of the digital signals and produce gradual changes in the TV display.

Operator controls are provided to modify the configuration of the display sub-signal generator by modifying the resistor and/or capacitor connections, modifying the value of resistances or capacitances in the network, or modifying the response of the audio signal conditioning. This allows the adjustment of the display by the operator to produce an aesthetically pleasing pattern. Other operator controls may be provided to modify the volume or bandwidth of the incoming audio signal.

Other objectives, advantages and applications of the present invention will be made apparent by the following detailed description of a preferred embodiment of the invention and several alternative embodiments. The description makes reference to the accompanying drawings in which.

Figure 1:
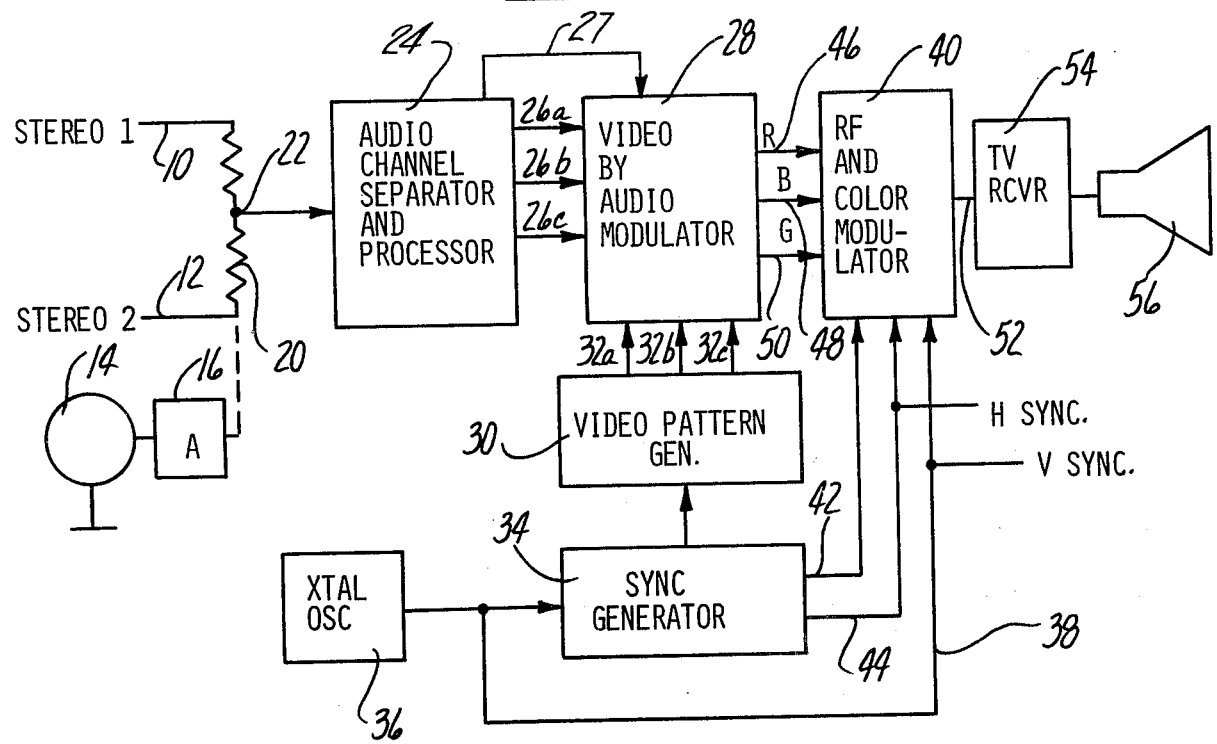
FIG. 1 is a block diagram of a preferred embodiment of our invention.

Referring to the block diagram of FIG. 1, the preferred embodiment of the invention is adapted to receive a pair of audio frequency electrical signals on lines 10 and 12, which represent two outputs of a stereo sound source such as a record player, or a stereo radio receiver. The two signals may be derived by direct electrical connection to the sound source, such as the two signals which would normally be provided to the loudspeakers in a stereo sound system or, alternatively, may be derived by microphones positioned to receive sound generated by the separate channels of an audio source. This alternative arrangement is illustrated by the microphone 14 which feeds an amplifier 16 having a dotted line output connection to the line 12, indicating its alternative form of usage. A similar microphone and amplifier would be connected to the line 10 if this alternative were used.

The signals 10 and 12 are passed through a pair of resistors 18 and 20 which act as a summing junction to provide a single audio signal on line 22. If a stereo signal is not required or used, a single audio signal may be provided on line 22 from an appropriate sound source or pick-up.

The signal on line 22 passes to an audio channel separator and processor 24 operative to automatically adjust the gain of the input signal and to provide a plurality of outputs, each representative of one component of the input signal on line 22. The separator and processor 24 acts to separate the audio signals into a plurality of separate components and to rectify and then peak detect each of these components separately to produce a plurality of output signals. In the preferred embodiment of the invention these components each represent an audio frequency band of the input signal. Preferably, three separate outputs are derived on lines 26a, b and c, although other numbers of outputs may be used in alternative embodiments of the invention. In the preferred system the output on line 26a is derived by a low pass filter, having a cut-off at approximately 150 cycles; the output signal on line 26b is derived by a band-pass filter centered at 1100 cycles and the output on line 26c is generated by a high pass filter with a cut-off point at 3300 cycles per second.

The separator and processor 24 also generates an output on line 27 representing the DC level of the gain controlled, full band input signal on line 22.

It should be recognized that these frequency cut-offs, and the manner of deriving the audio signal in the preferred embodiment are somewhat arbitrary, and in alternative embodiments of the invention they can be replaced by other apparatus for generating a plurality of signals, each representative of a different component of an audio input.

The outputs on lines 26a through 26c and 27 are provided to a video by audio modulator 28. The modulator also receives a plurality of signals from a video pattern generator 30. In the preferred embodiment of the invention three of these video pattern signals are provided to the modulator 28 on lines 32a, 32b, and 32c. In the preferred embodiment of the invention, the patterns are abstract, are generated in timed relation to a television raster scan, and have a rate of change which exceeds the television frame rate.

The video pattern generator 30 is driven by a synchronization generator 34 which essentially constitutes a counter chain. The generator 34 is driven by a crystal clock 36 which preferably constitutes a 3.58 megacycle oscillator. This is the frequency of the chrominance reference generator in an NTSC television standard transmission system. The output of the crystal oscillator 36 is also provided on line 38 to a radio frequency generator and color modulator circuit 40. The modulator 40 also receives signals on lines 42 and 44 from the synchronization generator counter chain 44, representing the horizontal and vertical syncrhonization signals required for generation of a composite TV signal. Accordingly, the crystal oscillator 36 and the synchronization generator 34 control the rate of generation of a TV raster provided by the modulator 40 and also the generation of the video pattern by circuit 30. This assures that the pattern is generated in synchronism with the TV raster display.

The video by audio modulator 28 receives the audio signals on lines 26a-c and 27, and the video pattern signals on lines 32a-d and generates three chrominance signals on lines 46, 48 and 50. These signals are provided to the radio frequency and color modulator 40.

The modulator 40 utilizes the timing signals on lines 38, 42, and 44 and the chrominance signals on lines 46, 48 and 50 to modulate an RF signal and produce a radio frequency composite television signal of the same nature as the television signal broadcast by a television transmitter. This signal may be applied directly to the antenna terminal 52 of a conventional television receiver 54. The radio frequency of the modulator 40 is chosen to coincide with a television channel that is not used by a television broadcast station in the area in which the system is to be employed. When it is desired to use the display the television receiver is tuned to that modulator channel. The system is energized and an appropriate audio source is provided on the input lines 10 and 12. The cathode ray tube 56 of the receiver 54 then displays an abstract pattern controlled by the video pattern generator and modulated by the audio input so that the pattern changes in timed relation to the change in the audio signal.

It should be recognized that the radio frequency modulator 40 serves the purpose of allowing the system to be connected to the antenna terminals of the receiver. In certain installations it may be desirable to connect lines 46, 48 and 50 directly to the chrominance terminals of cathode ray tube 56. The television receiver's internal chrominance oscillator may be then connected to the synchronization generator 34 which will produce the required synchronization signals for the television receiver.

Figure 2:
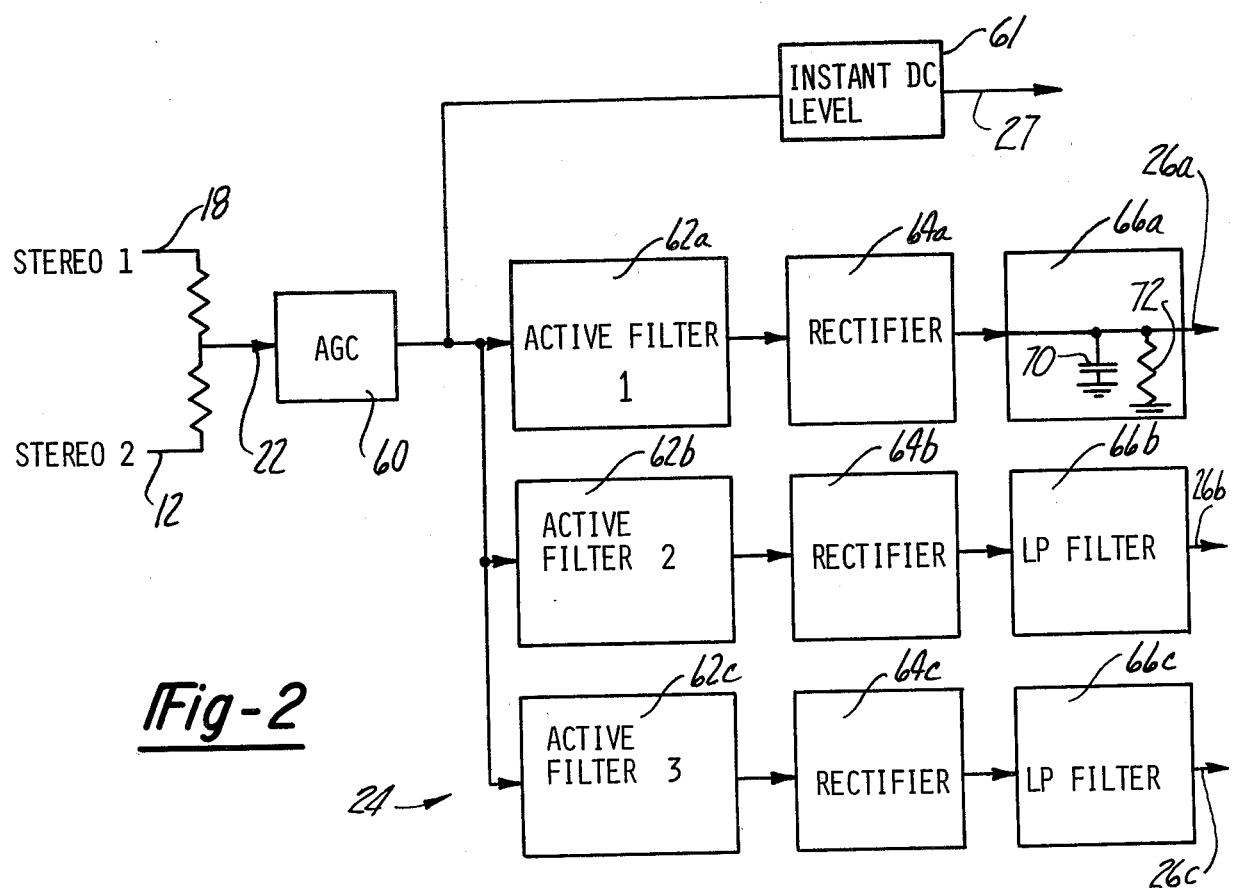
FIG. 2 is a block diagram of the audio channel separator and processor employed with the system of FIG. 1.

FIG. 2 illustrates the audio channel separator and processor 24 of the system of FIG. 1 in greater details. The composite audio signal on line 22, derived by summing the stereo signals on lines 10 and 12 with resistors 18 and 20, or in some other suitable manner, is applied to an automatic gain control circuit 60 which operates to regulate the level of its output independently of relatively slow rate changes in the incoming audio signal. This allows the system to operate with a relatively wide range of incoming audio signal amplitudes.

The output of the automatic gain control 60 is provided to the detector 61 having a fast response time so as to provide an output on line 27 representative of the substantially instantaneous DC level of the gain controlled signal. This signal closely follows rapid changes in the music produced by crescendos and the like.

The output of the gain control circuit 60 is also provided to three active filters, 62a, 62b and 62c. Filter 62a is a low pass filter having a cut-out frequency of 150 Hz; the filter 62b is a band-pass filter centered at 1100 Hz and filter 62c is a high pass filter having a low end cutoff at 3300 Hz. As has been noted these frequency levels are arbitrary and may be modified in alternate embodiments of the invention.

The output of each filter is provided to a separate rectifier, 64a, 64b and 64c. Each of the rectified signals is then provided to separate low pass filters, 66a, 66b and 66c. The low pass filter 66a is typical and is illustrated as employing an integrating capacitor 70, shunted by a resistance 72. This circuit provides an output that rapidly follows a rising input voltage but decays more slowly than a rapidly decaying voltage. Resistor 68 controls the rate of charging of the capacitor 70 and the resistor 72 controls the rate of decay of the charge on the capacitor 70.

Figure 3:
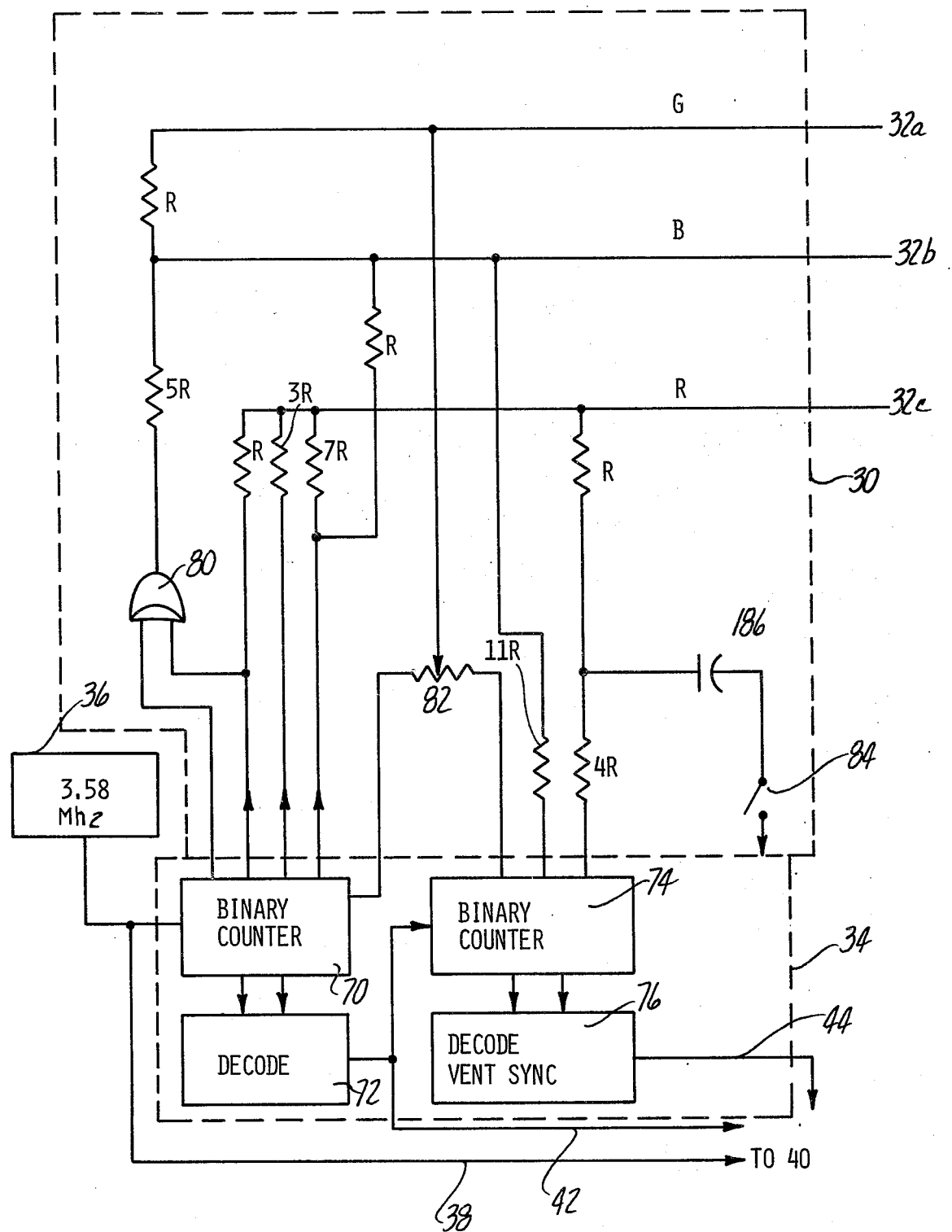
FIG. 3 is a partially block, partially schematic view of the video pattern generator and the synchronization generator circuitry employed with the preferred embodiment of the invention.

The organization of the video pattern generator 30 and the synchronization generator 34 will now be described in more detail in connection with the partially block, partially schematic diagram of FIG. 3. The 3.58 megahertz chrominance reference oscillator 36 provides its output signal to a binary counter 70 contained within the synchronization generator 34. This counter consists of a series of binary stages. All of its outputs are provided to a decoder circuit 72 which generates the horizontal synchronization signal on line 42 at a rate of 15.6 kilohertz. This output also acts as an input to a second binary counter stage 74. The counter 70 is preferably a modulo 226 counter formed by a controllable 15 or 16 stage counter feeding a divide by 15 counter, which feeds back to the primary counter to cause it to count to 16 during one cycle and 15 during the successive cycle. Similary, the counter 74 is a modulo 264 counter.

The outputs of the counter 74 are provided to a decoder 76 which generates the vertical synchronization signal on line 44. These counters and decoders may be implemented with discrete semi-conductors or as ingtegrated circuits.

The outputs of the counter 70 and 74 are also provided to the video pattern generator 30 broadly consisting of a digital to analog mapping network which provides the three analog outputs required by the video by audio modulator 28. While the choice of three outputs is preferred, one for each of the red, blue and green chrominance signals, in alternative embodiments of the invention two or more outputs could be utilized.

The mapping network primarily functions to sum the outputs of various stages of the counter 70 and 74 to provide signals to the lines 32a, b and c. The resistors in the mapping network are marked in FIG. 3 as a function of their multiples of resistance in the unitary value R. The interconnections are quite arbitrary and may be modified to provide an aesthetically pleasing pattern. In addition to the fixed resistors one of the networks employs a NOR gate 80 which receives two of the relatively early stages of the counter 70. This signal is interconnected with various resistors into the summing network for all three of the signals and gives a basic repetition rate to the abstract pattern generator by the circuit. A variable resistor 82 is used in a summing network for one of the patterns. This control preferably appears on the front of the control box for the system and allows an operator to adjust the pattern to an aesthetically pleasing form. Another control is provided by a switch 84 that connects a capacitor 86 into the summing network for the line 32c. When this capacitor is in the circuit, it slows the decay time of the signal appearing one line 32c and acts to change the shape of the pattern on the screen. Again, the switch is controlled by the operator to produce an aesthetically pleasing pattern.

In alternative embodiments of the system a greater or lesser number of mutual controls may be proivded to modify the pattern displayed by the system.

Figure 4:
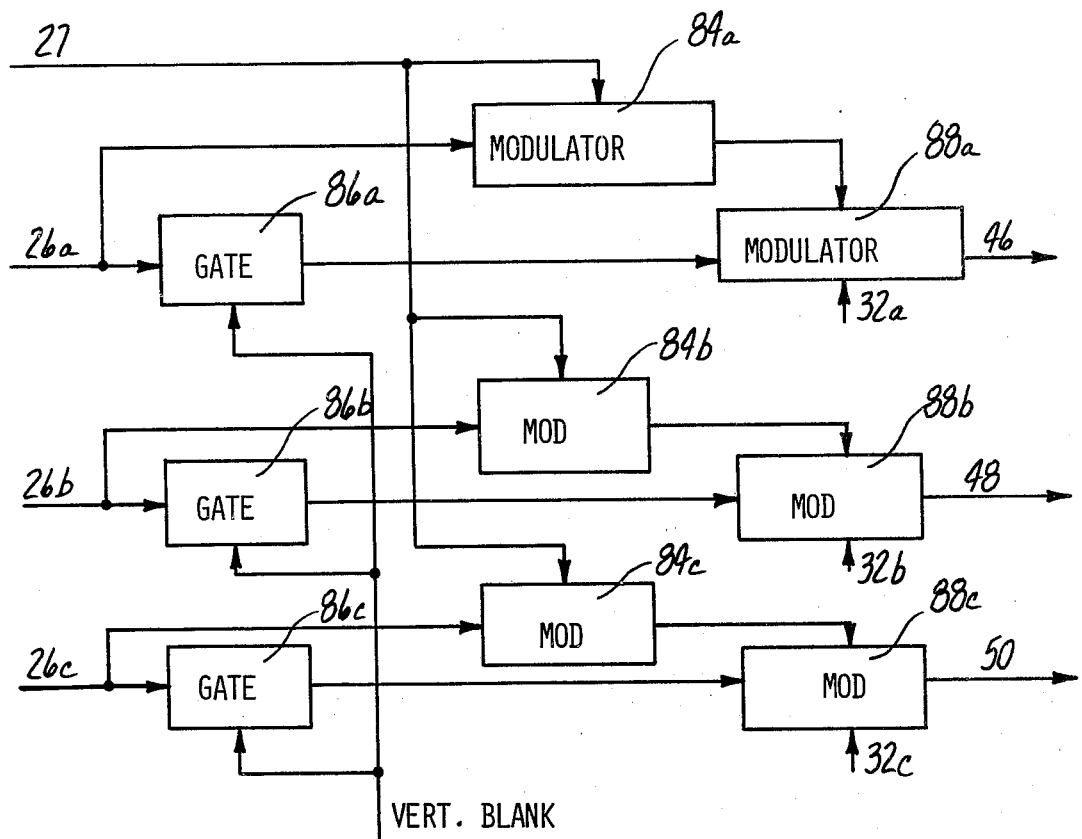
FIG. 4 is a block diagram of the video by audio modulator subsystem.

FIG. 4 is a detailed block diagram of the video-by-audio modulator 28 which receives audio signals from the channel separator and processor 24 as well as video pattern signals from the generator 30, and develops the red, blue and green chrominance signals. The fast average DC signal for the full audio spectrum on line 27, is provided to three modulators 84a, 84b and 84c. The other input to these three modulators are from lines 26a, 26b and 26c, respectively. The modulators each multiply the fast average value by the respective band signals to derive a composite audio signal that changes relatively slower yet contains bursts representative of fast, high amplitude changes in the composite audio signal. The three audio bands on lines 26a, 26b and 26c are also provided to three gates, 86a, 86b and 86c which are gated by the vertical blanking signal derived by the synchronization generator 34. This turns the modulator 28 off during the vertical blanking period. The outputs of gates 86a, 86b and 86c are respectively provided to three modulators 88a, 88b and 88c. These modulators each receive one of the pattern signals on lines 32a, 32b and 32b from the video pattern generator 30. They act to multiply these two inputs and a third input derived from the multipliers 84a, 84b and 84c respectively. The output signals of the modulators 88a through 88c, on lines 46, 48 and 50 respectively, represent the red, blue and green chrominance signals provided to the RF and color modulator 40.

The interconnection of the various audio channel signals to the modulators is arbitrary and controls the aesthetic nature of the pattern. In alternative embodiments of the invention, operator controlled switching networks could be provided to modify the interconnection of the audio signals to the three modulators in order to modify the pattern.

Figure 5:
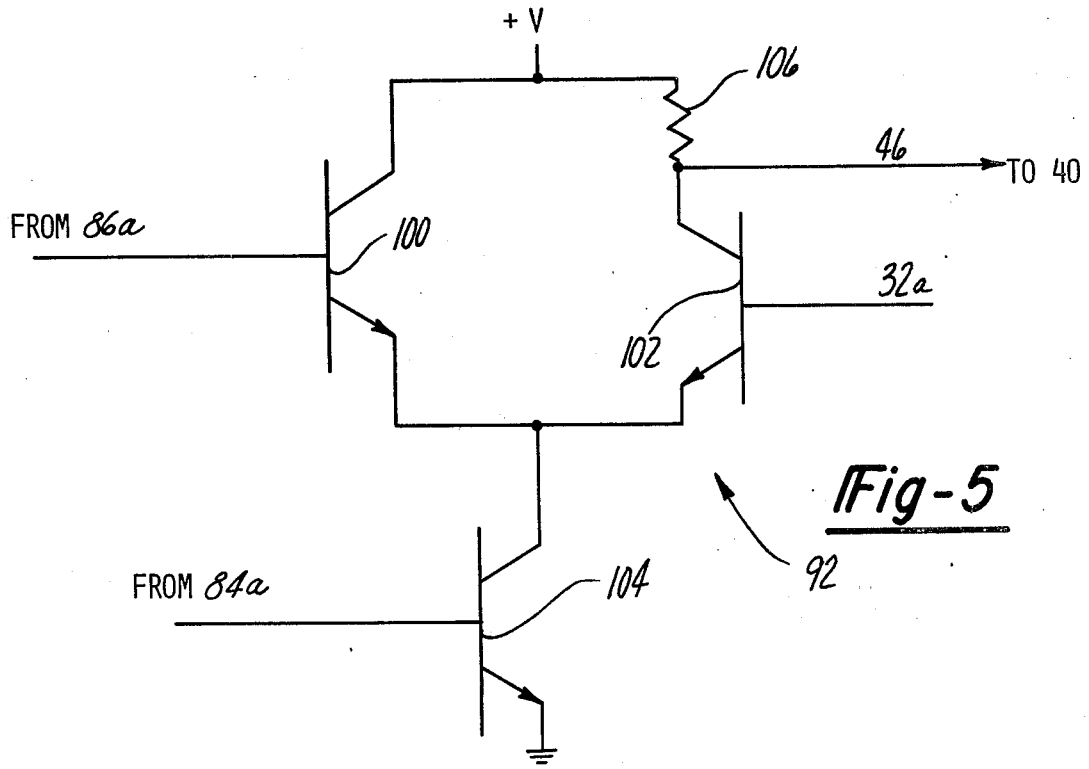
FIG. 5 is a schematic diagram of one of the modulators employed in the video by audio modulator subsystem.

The schematic structure of a preferred embodiment of the modulator 88a (which is identical to the modulators 88b and 88c) is illustrated in FIG. 5. The modulator employs a pair of NPN transistors 100 and 102 having their emitters connected together to the collector of a third NPN transistor 104. The collector of transistor 100 is connected to the positive terminal of the power supply and the collector of transistor 102 is connected to the positive terminal of the power supply through a resistor 106. The emitter of transistor 104 is grounded. The base of transistor 100 is connected to the audio input from gate 86a while the base of transistor 102 is connected to the red pattern signal on line 32a. The transistors 100 and 102 form a differential amplifier which generates a voltage proportional to the difference between the audio signal and the pattern signal on line 32a. The two differential amplifier transistors have a gain proportional to the current flowing through them which is controlled by the emitter-collector current of transistor 104. That current is in turn controlled by the signal from modulator 84a. This acts as an intensity control. The upper and lower limits of the voltage on line 46 are controlled by the fully conductive and non-conductive conditions of the transistor 104.

In the preferred embodiment of the invention, the RF and color modulator 40 is implemented with an LM 1889 integrated circuit of the type sold by National Semiconductor Company. This circuit has two separate radio frequency oscillators, which may be selected by manual switch, to choose the television channel that the signal is provided on.

The embodiments of the invention in which an exclusive property or privilege is claimed are defined as follows:

1. A chrominance generator circuit for a television receiver having three chrominance inputs, comprising: means for receiving an audio signal and generating a plurality of first electrical signals, each of the first signals being a function of the instantaneous amplitude of one portion of the total frequency band width of the audio signal; means, independent of said first signals, for generating a plurality of second electrical signals as a function of a pattern to be displayed on the television receiver; three modulators, each connected to receive at least certain of said first signals and at least certain of the second signals to produce output signals which have functions of these input signals; and means for providing the three modulator output signals to the three chrominance inputs of the color television receiver.

2. The chrominance generator of claim 1 wherein said means for generating a plurality of second electrical signals which are a function of a pattern to be displayed on the television receiver comprises means for producing a plurality of digital signals having a unique time relation to the raster scan of the television receiver.

3. The chrominance generator of claim 2 including an oscillator and a digital divider chain driven by the oscillator and connected to the raster scan generators of the television receiver and said means for producing a plurality of second electrical signals.

4. The chrominance generator of claim 2 wherein said means for generating a plurality of digital signals having a unique time relation to the receiver raster scan includes an oscillator; a counter driven by the oscillator; and a summing network including resistances connected to various outputs of the counter.

5. The chrominance generator of claim 4, further including capacitances interconnected to at least certain of the resistances to modify the rise and decay time of the voltages appearing at the output of the summing network.

6. The chrominance generator of claim 1 in which said means for connecting the outputs of the three modulators to the chrominance inputs of the color television receiver includes a radio frequency generator operative to receive the chrominance signals and having its output connected to the antenna of said television receiver.

7. The chrominance generator of claim 6 including an oscillator and a divider chain driven by the oscillator and connected to said means for generating a plurality of second electrical signals and to said radio frequency generator to generate vertical and horizontal synchronization signals for the television receiver.

8. A system for generating the displays on the screen of a color television receiver having chrominance inputs in timed relation to an audio signal, comprising: means for receiving the audio signal and generating a plurality of first electrical signals, each having a value which is a function of the instantaneous intensity of a separate frequency component of the audio signal; an oscillator; a divider chain driven by the oscillator; circuit means connected to stages of the divider chain and operative to generate horizontal and vertical synchronization signals for a color television receiver; digital to analog converter means connected to stages of the divider chain operative to generate a plurality of second electrical signals; a plurality of modulators each having as inputs at least one of said first electrical signals and at least one of said second electrical signals, and each being operative to generate output signals which are a function to each of its inputs; and means for connecting the outputs of the modulators to the chrominance inputs of said color television receiver.

9. The system of claim 8 in which said digital to analog converters connected to the output of the various counter chains include a matrix of resistances of various values, each connected to a different stage and joined in a summing network.

* * * * *

UNITED STATES PATENT AND TRADEMARK OFFICE
CERTIFICATE OF CORRECTION

PATENT NO. : 4,167,752

DATED : 9/11/79

INVENTOR(S) : Jerome E. Liebler and Walter M. Rubinstein

It is certified that error appears in the above-identified patent and that said Letters Patent are hereby corrected as shown below:

Column 5, Line 34-35, "ingtegrated" should be --integrated--.

Column 6, Line 2, "mutual" should be --manual--.

Column 6, Line 2, "proivded" should be --provided--.

Column 6, Line 25, "32b and 32b" should be --32b and 32c--.

Signed and Sealed this

First Day of April 1980

[SEAL]

Attest:

SIDNEY A. DIAMOND

Attesting Officer

Commissioner of Patents and Trademarks